United States Patent [19]

Weiler

[11] Patent Number: 4,998,739
[45] Date of Patent: Mar. 12, 1991

[54] ARRANGEMENT FOR THE SEALING-OFF OF SPACES ACTED UPON BY MEDIA OF DIFFERENT PRESSURES FOR TURBOMACHINERY AND THE LIKE

[75] Inventor: Wolfgang Weiler, Dachau, Fed. Rep. of Germany

[73] Assignee: Mtu Motoren- und Turbinen-Union Muenchen GmbH, Fed. Rep. of Germany

[21] Appl. No.: 398,508

[22] Filed: Aug. 25, 1989

[30] Foreign Application Priority Data

Aug. 25, 1988 [DE] Fed. Rep. of Germany ....... 3828833

[51] Int. Cl.$^5$ .......................... F16J 15/16; F16J 15/44
[52] U.S. Cl. ...................................... 277/53; 277/173; 277/181; 415/231
[58] Field of Search .............. 277/15, 27, 53, 54, 277/83, 97, 148, 149, 151, 173–176, 181, 186, DIG. 5; 384/100, 103, 114, 119; 415/229, 230, 231, 170.1, 174.1, 174.2

[56] References Cited

U.S. PATENT DOCUMENTS

| | | | |
|---|---|---|---|
| 2,880,045 | 3/1959 | Wankel | 277/174 X |
| 3,001,806 | 9/1961 | Macks | 277/27 X |
| 3,460,842 | 8/1969 | Pointer et al. | 277/53 X |
| 3,511,510 | 5/1970 | Lindeboom | 277/27 |
| 3,982,765 | 9/1976 | Fickelscher et al. | 277/53 |
| 3,997,175 | 12/1976 | Geary . | |
| 4,173,350 | 11/1979 | Sieghartner | 277/173 X |
| 4,291,887 | 9/1981 | Etsion et al. | 277/27 |
| 4,411,437 | 10/1983 | Conti | 277/54 X |
| 4,552,368 | 11/1985 | Wallace | 277/174 X |
| 4,723,781 | 2/1988 | Turanskyi et al. | 277/83 X |
| 4,848,932 | 7/1989 | Puetz | 384/119 X |

Primary Examiner—Allan N. Shoap
Assistant Examiner—Scott Cummings
Attorney, Agent, or Firm—Evenson, Wands, Edwards, Lenahan & McKeown

[57] ABSTRACT

An arrangement is disclosed for the sealing-off of spaces acted upon by media of a different pressure, for turbomachines, in which a sealing ring is arranged in a cylindrical housing while forming a radial sealing gap as a primary seal, and having a secondary leakage flow passage between a wall section of the housing and the sealing ring which communicates with the space having a lower pressure, the sealing ring being centered by means of spring elements which are anchored at the housing on one side and are arranged essentially in parallel with respect to the machine axis.

33 Claims, 5 Drawing Sheets

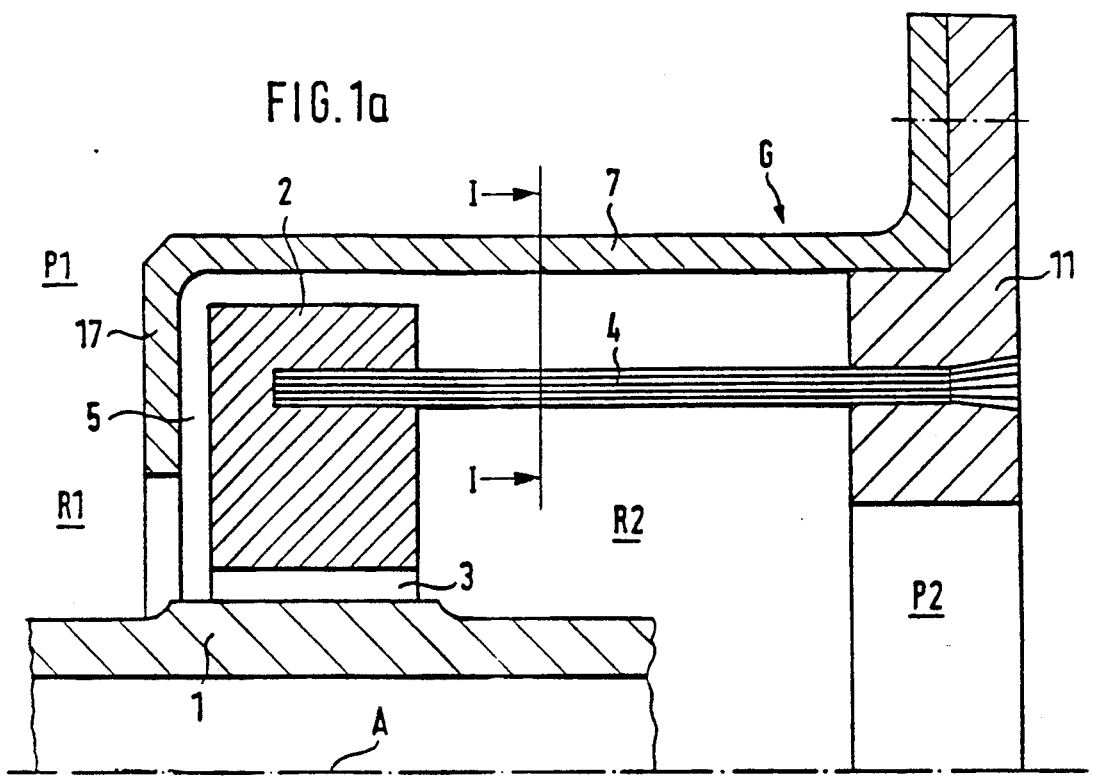
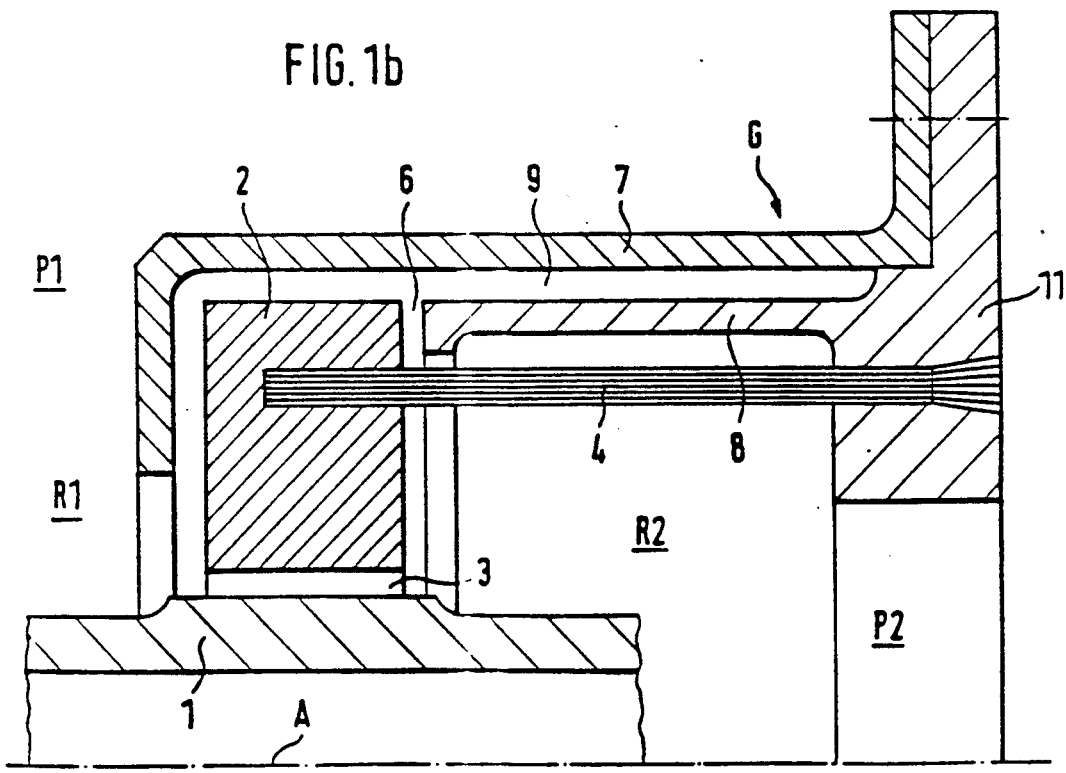

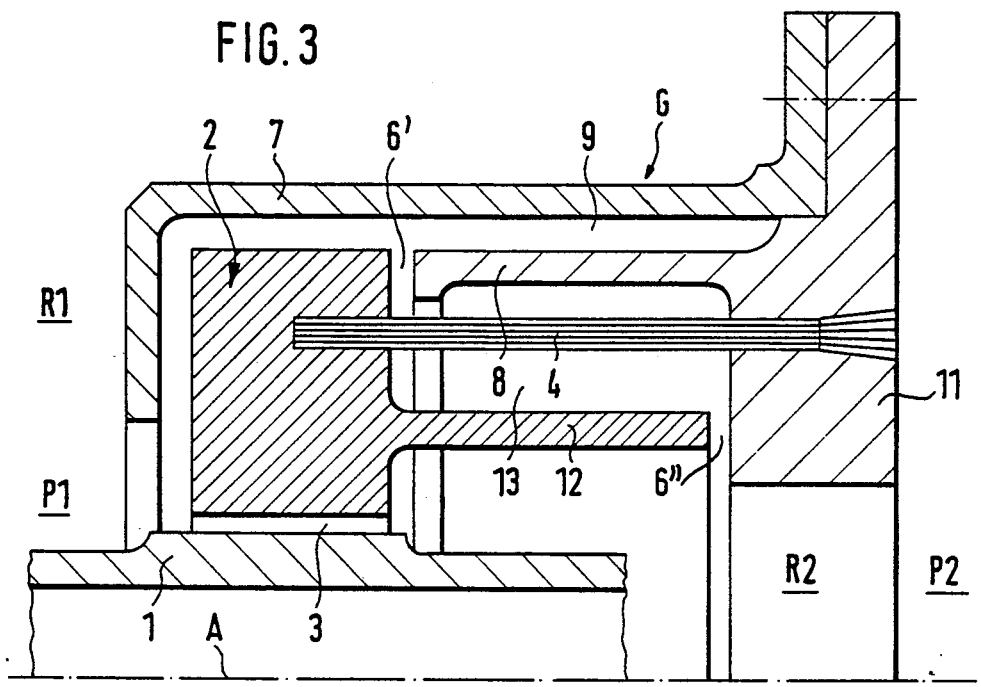
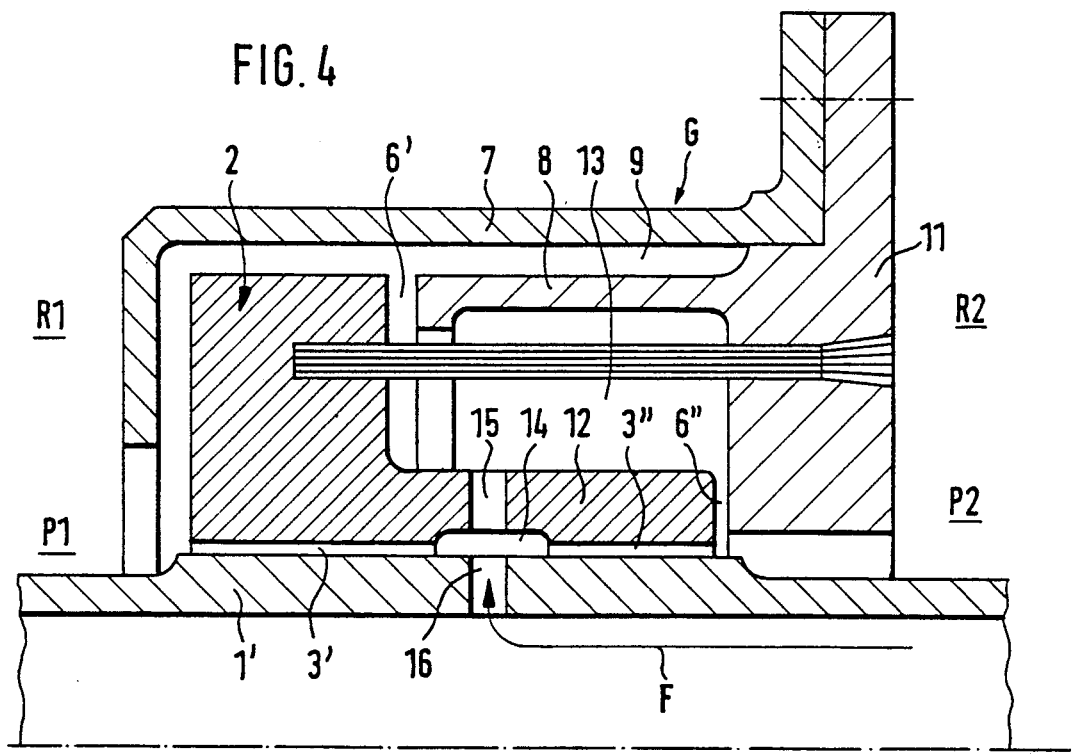

ARRANGEMENT FOR THE SEALING-OFF OF SPACES ACTED UPON BY MEDIA OF DIFFERENT PRESSURES FOR TURBOMACHINERY AND THE LIKE

BACKGROUND AND SUMMARY OF THE INVENTION

The invention relates to a sealing arrangement for the sealing-off of spaces acted upon by media of different pressures, such as fluids and/or gases, particularly for turbomachinery, said arrangement including sealing ring means arranged in a cylindrical housing device while forming a secondary seal and being disposed with respect to an adjacent rotor section to form a radial sealing gap means as a primary seal.

It is still difficult in practice to ensure a no-contact operation for sealing devices of the initially mentioned type and to construct them with a relatively low overall height; specifically between rotating and stationary components or shaft sections or between components or shaft sections which rotate around a common axis at different rotational speeds.

Although generally known labyrinth sealing devices have the advantage that they operate axially and radially practically without any contact and permit almost unlimited circumferential speeds, these advantageous characteristics are counteracted by the significant disadvantages of a relatively large axial overall length as well as of relatively high seal leakage flows.

For the mentioned sealing purposes, brush sealing devices are generally known, the bristle ends of which are firmly anchored at a stator and the other free bristle ends of which are directed in sliding contact against the rotor or a shaft section. Although such brush sealing devices permit high circumferential speeds and allow a short axial overall length, they require a large radial installation height and, as a result of continuous abrasive contact, cause a wearing-off of the bristles and a local abrasion of the material at the corresponding countersurface of the rotor.

Radial sliding ring sealing devices are also known which comprise a housing; a sliding ring; an element which is elastic in axial direction; and the pertaining shaft or the pertaining shaft section. The primary seal is therefore constructed between the corresponding inner surface of the sliding ring and the countersurface of the rotor or of a shaft section, specifically by way of the fluid gap which is generated in this case as a result of the pressure difference between two spaces to be sealed off. In the case of this known sliding ring sealing device, the sliding ring is sealingly guided, for example, between a supporting shoulder of the housing on one side and a movable spring plate for example on the other side which has the effect of the spring element (secondary seal).

Such "simply" constructed sliding ring sealing devices cannot meet perfect sealing requirements when they have the purpose of sealing off, for example, storage space in gas turbine engines with respect to the engine inlet or the engine environment or with respect to the exhaust gas flow, thus localities which normally have a lower pressure level than the storage space in front of the sealing device. In addition, sliding ring sealing devices require a large installation volume and ensure only low circumferential speeds.

An object of the invention is to provide an arrangement of the initially mentioned type which, while ensuring relatively high circumferential speeds, with a comparatively low installation height and a relatively small installation volume, operates practically without any wear and without any abrasion of material.

The object is achieved according to certain preferred embodiments of the invention by providing an arrangement wherein the sealing ring means are centered by means of bending-rod-type spring element means which are anchored on one side at the cylindrical housing device and are arranged essentially in parallel to the machine axis, and wherein the radial sealing gap means between the sealing ring means and adjacent rotor section are dimensioned such that they form an air-bearing-type bearing gap with respect to a given pressure difference ($P1 > P2$) between two machine spaces.

The sealing arrangement according to the invention avoids the essential disadvantages of the initially mentioned types of sealing devices.

According to the invention, a sealing arrangement is therefore obtained in which, in the area of the sealing point, a sealing ring is arranged concentrically with respect to the shaft such that a radial gap is generated between the shaft and the sealing ring which is small and which is constructed in the size which is customary in air bearings. This has the result that the sealing ring, like an air bearing, follows static and dynamic axial deviations. This gap between the sealing ring and the shaft defines the so-called "primary leakage" of the sealing device. The sealing ring itself, by way of a connection of bending rod springs which are essentially parallel to the seal axis or are arranged at a certain angle with respect to the seal axis, is centered, for example, with respect to the stator of the sealing device, in which case the length and the number of the bending rod springs depend on the dynamics of the machine at the sealing point. An axial gap is arranged between the stator of the sealing device and the sealing ring, either on a diameter inside and/or outside the diameter of the bending rod connection, this axial gap being as small as possible (size 0.02–0.03 mm) and determining the so-called "secondary leakage" of the sealing device. Around the mentioned elements of the sealing device, a cylindrical protective cap or a hood-type body is arranged which, as required, can be formed by the components at which the sealing device is to be arranged. Depending on the flow direction of the sealing device ($P1 > P2$ or $P2 > P1$), a bonding of the bending rod connection with the sealing ring is advantageous by means of a known bonding technique, such as welding, soldering, gluing or clamping.

Depending on the dynamic conditions, the mentioned bending rod connection may be constructed of individual free-standing bending rods (FIG. 6, like the spring, without any damper) or of a brush-type packed connection of rods (FIG. 7) which rest against one another (spring plus damper).

Other objects, advantages and novel features of the present invention will become apparent from the following detailed description of the invention when considered in conjunction with the accompanying drawings.

BRIEF DESCRIPTION OF THE DRAWINGS

FIG. 1a is a schematic central longitudinal sectional view of a sealing device constructed in accordance with a first preferred embodiment of the invention;

FIG. 1b is a schematic central longitudinal sectional view of a sealing device constructed in accordance with a second preferred embodiment of the invention;

FIG. 3 is a schematic central longitudinal sectional view of a sealing device constructed in accordance with a fourth preferred embodiment of the invention;

FIG. 4 is a schematic central longitudinal sectional view of a sealing device constructed in accordance with a fifth preferred embodiment of the invention;

DETAILED DESCRIPTION OF THE DRAWINGS

Figure 2:
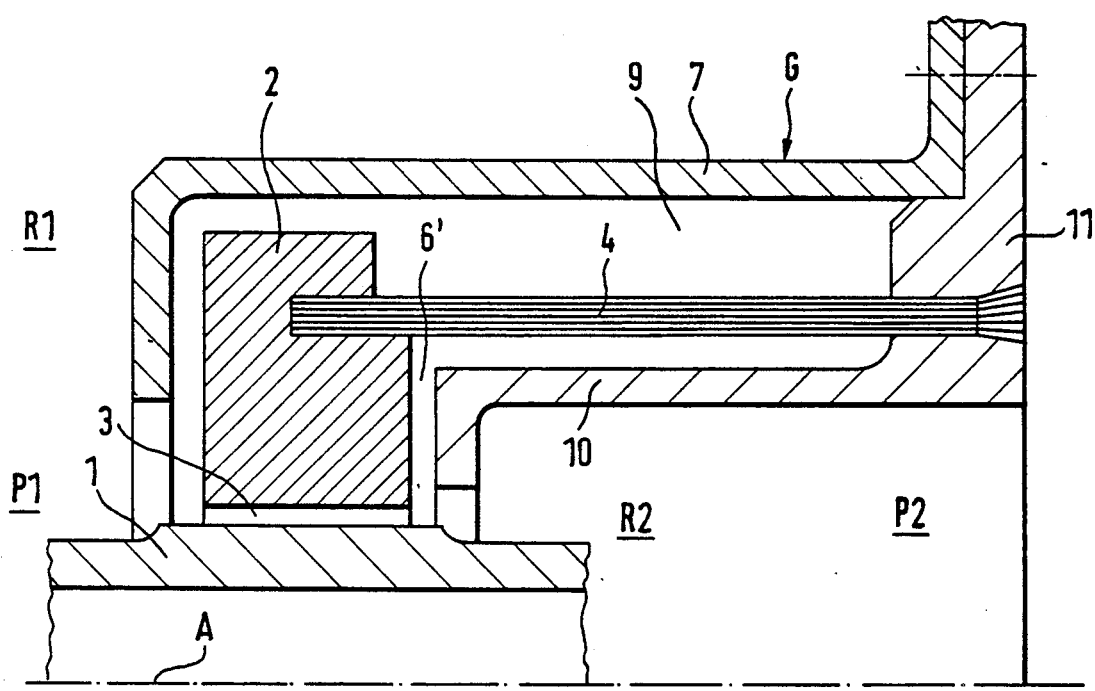
FIG. 2 is a schematic central longitudinal sectional view of a sealing device constructed in accordance with a third preferred embodiment of the invention.

FIGS. 1a and 1b depict arrangements for the sealing-off of spaces R1, R2 which are acted upon by media of different pressures (P1 > P2), such as fluids and/or gases in a turbomachine. A sealing ring 2 is arranged in a cylindrical housing device G while forming a secondary seal and forming a gap with respect to an adjacent shaft section 1 of the rotor 3 as a primary seal. In these arrangements, the sealing ring 2 is centered by means of bending-rod-type spring elements 4 anchored on one side at a cylindrical housing device G and extending in parallel to the machine axis A. In the embodiment according to FIG. 1a, a ring-shaped front wall 17 of the housing device G, together with the sealing ring 2, forms a secondary air flow passage which communicates with the machine space R2.

In the embodiment according to FIG. 1b, the housing device G, with the wall sections 7, 8 bordering on the sealing ring 2, forms a chamber 9 which communicates with both machine spaces R1, R2. Between one wall section 8 of the housing device G and the sealing ring 2, a secondary leakage flow passage 6 (leakage flow throttling point) is formed which communicates with space R2 having the lower pressure P2. The radial sealing gap 3, with respect to a given pressure difference (P1 > P2) between the two machine spaces R1, R2, is dimensioned such that it forms an air-bearing-type bearing gap. FIG. 1b also shows that the secondary leakage flow passage 6 is constructed as an axial gap between the outer front end of the first wall section 8, which extends in parallel above the spring elements 4, and an outer front face or countersurface of the sealing ring 2.

The throttling points 5, 6 according to FIGS. 1a and 1b may be provided alternatively or cumulatively.

While using the same reference numbers for essentially the same or similarly constructed components and functions, FIG. 2 represents a modification of FIG. 1b in that the secondary leakage flow passage 6' is to be constructed as an axial gap between the outer front end of a wall section 10 which, in this case, extends essentially in parallel but below the spring elements 4, and an outer circumferential surface or countersurface of the sealing ring 2.

The embodiments according to FIGS. 1a, b and FIG. 2 also have in common that the housing device G, in each case, is comprised of a ring-shaped hood body which contains or forms the corresponding first wall section 7 and, in addition, of a stator component 11 of the sealing device which is firmly connected with the hood body and contains the respective second wall section 8 and 10.

FIG. 3 is an embodiment of a sealing device which is essentially modified in comparison to FIG. 1b in that another secondary leakage flow passage 6" is to be formed, as an axial gap, between the outer front end of a third wall section 12 of the sealing ring 2 which, in this case, extends in parallel below the spring elements 4, as well as an adjacent circumferential surface of the stator component 11 of the sealing device. As in FIG. 1b or in FIG. 2, in the case of the embodiment according to FIG. 3, the corresponding primary seal is naturally also formed by an air-bearing-type bearing gap 3. In addition, FIG. 3 also shows that the second and the third wall section 8 and 12 enclose an annular chamber 13 which, by way of the one and the additional secondary air passage 6' and 6", makes available the secondary leakage flow of the corresponding pressure medium from machine space R1, which has the higher pressure (P1), to machine space R2, which has the lower pressure (P2).

FIG. 4 shows an embodiment of a sealing device which is modified essentially with respect to FIG. 3 in that the corresponding third wall section 12 of the sealing ring 2 with respect to a wall section 1' of the rotor 2 is to form air-bearing-type bearing gaps 3', 3" which are separated from one another by means of a ring gap 14. In this case, a sealing-fluid supply F on the interior side of the shaft takes place from the ring gap 14 into the bearing gaps 3', 3" as well as into the annular chamber 13 formed between the second and the third wall section 8 and 12. From the mentioned annular chamber 13, the sealing fluid F, by way of a secondary leakage flow point 6', can then flow into the one machine space R1 and, by way of the additional secondary leakage flow point 6", can flow off into the other machine space R2. In the embodiment according to FIG. 4, the two air-bearing-type bearing gaps 3' and 3" therefore form a "labyrinth-type" double seal. Particularly, this last-shown and last-described embodiment according to FIG. 4 is suitable for being used in gas turbine engines, where the object may be to seal off a space R1, which is located on the side of the engine and is connected behind an oil-lubricated bearing, with respect to, for example, the engine inlet (space R2) or to seal off the above-mentioned engine space (space R1) which is connected behind an oil-lubricated bearing, with respect to the engine exhaust gas flow (engine space R2).

With respect to FIG. 4, it should also be pointed out that the feeding of the sealing fluid, for example, in the form of air or as a gas, takes place from the interior side of a hollow shaft forming the shaft section 1', specifically by way of radial bores 16 in this shaft section 1', into the above-mentioned annular space 14, from where a residual part of the sealing fluid F reaches the above-mentioned annular space 13 by way of radial bores 15 contained in the wall section 12 of the sealing ring 2. The mentioned bores 15 and 16 are exactly opposite one another while being aligned in axial direction.

Figure 5:
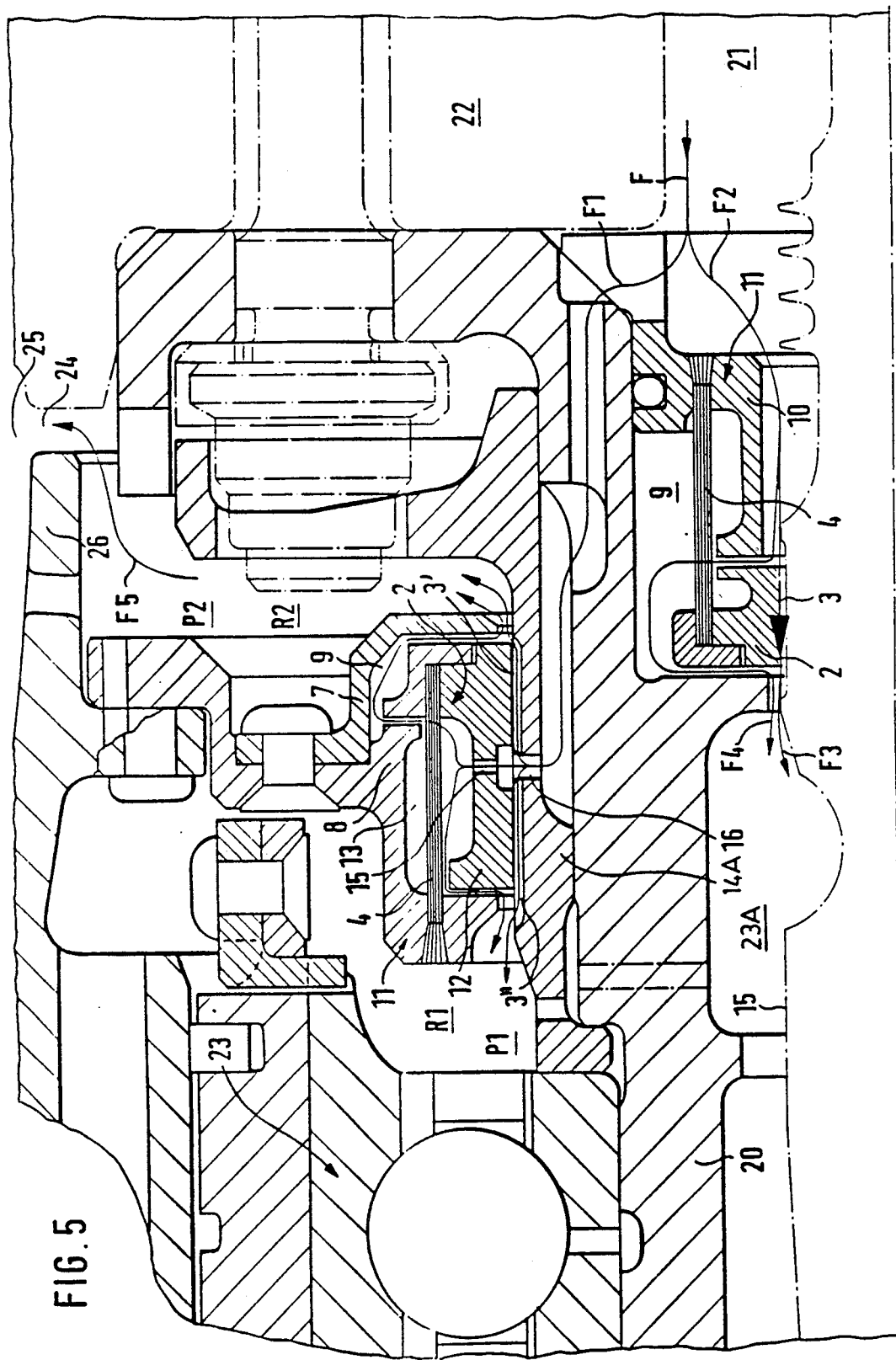
FIG. 5 is an also essentially a schematic central longitudinal sectional view of a double sealing concept in a combined assignment of engine details constructed according to a sixth preferred embodiment of the invention.

FIG. 5 shows the arrangement of two different configurations of the sealing device constructed at the corresponding compressor section of a gas turbine engine, specifically, according to FIG. 5, the sealing configuration according to the previously described FIG. 2 shown in the drawing essentially at the right bottom, which, in this case, however is constructed as an intershaft sealing device between an inner shaft 15 and an outer shaft 20, and approximately in the center of FIG. 5, the construction and arrangement of a sealing configuration as it was discussed and described in FIG. 4. Therefore, according to FIG. 5, while using a sealing device discussed and described in detail in FIG. 2, the corresponding radial gap or the air-bearing-type bearing gap 3 is formed between the pertaining sealing ring 2 and a corresponding circumferential countersurface of a hollow-cylindrical shaft 15. The hollow-cylindrical inner shaft 15 extends coaxially through the corresponding shaft 20 of the gas generator of the gas turbine engine. The hollow-cylindrical inner shaft, on one side, may be force-lockingly coupled with a low pressure turbine of the gas turbine engine which is aero-thermodynamically connected behind the gas generator turbine of the gas generator. The hollow-cylindrical inner shaft, for example, with the interposition of corresponding step-up gears or step-down gears, may be coupled with a helicopter rotor. In other words, a suitable power tapping from the hollow-cylindrical inner shaft 15, on the front side of the engine, can therefore also take place on the side facing away from the efficiency turbine. Sealing fluid F may be supplied in the form of sealing air from a coaxial ring duct 21 formed between the sealing device on one side as well as between a running wheel disk 22, on the one side, and the corresponding previously mentioned hollow-cylindrical inner shaft 15. As the sealing device constructed according to FIG. 2, it is supplied by a partial air flow F2 split off F. While achieving the secondary sealing there, a partial air flow F4, in turn, flows from the ring duct 9 of the sealing device into an annular space 23A which is formed between the shaft 20 of the gas generator and the corresponding hollow-shaft section 15 (inner hollow shaft). From the primary sealing device (radial air bearing gap 3), a residual partial leakage air flow F3 also flows off into the previously discussed annular space 23A between 15 and 20.

The other sealing device constructed according to FIG. 4 is supplied with another partial sealing air flow F1 split off F.

The sealing device constructed according to FIG. 4 seals off a space R1, which is connected behind an oil-lubricated ball bearing 23 in the FIG. 5 configuration. During the operation, it must therefore be assumed that the corresponding engine space R1 is acted upon by a gaseous oil mist from bearing 23, in which case, it is assumed that the fluid pressure P1 in engine space R1 is higher than the pressure P2 which exists in engine space R2 behind the sealing device. In this case, the radial air-bearing-like bearing gaps 3' and 3'' are therefore constructed between the wall section 12 of the sealing ring 2, on one side, and corresponding countersurfaces of the shaft section 14A. Shaft section 14A is co-rotatingly disposed on the shaft 20 of the gas generator. A residual leakage flow current F5 fed by primary and secondary residual air portions will then flow from engine space R2 connected behind the sealing device, by way of a ring gap 24, into the air intake duct 25 of the engine. The previously mentioned ring gap 24 is formed between stator structures 26 forming the inner wall of the air intake duct 25, on one side, and an upper outer front face of the previously mentioned wheel disk 22.

Figure 6:
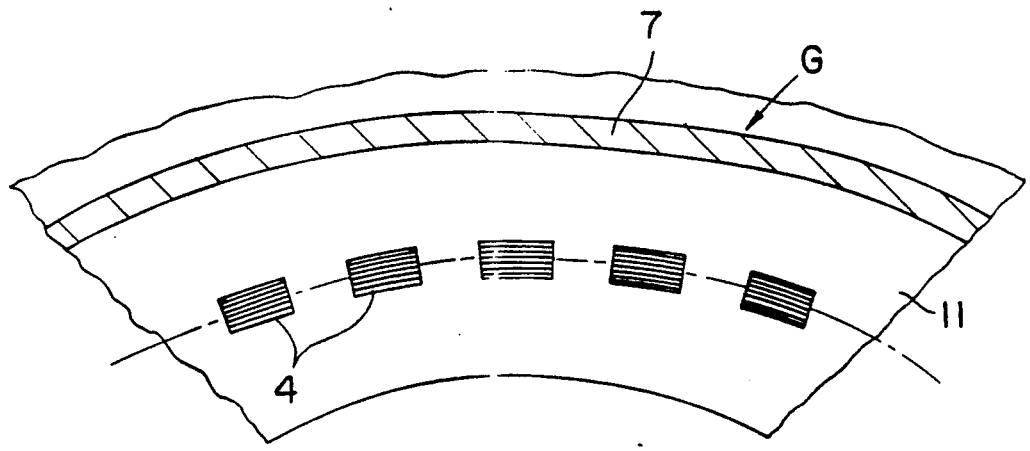
FIG. 6 is a sectional view along ling I—I of FIG. 1 showing the individual, free standing bending rods.
Figure 7:
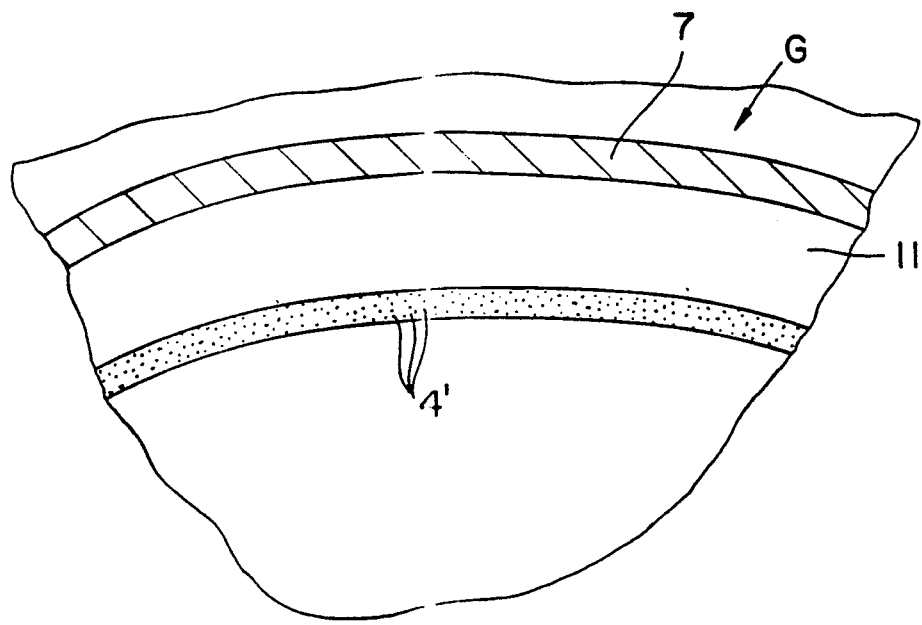
FIG. 7 is another embodiment of a view along line I—I of FIG. 1 illustrating the brush-type packed connection of bending rods.

FIGS. 6 and 7 illustrate advantageous arrangements of the spring rods 4 at a distance from one another concentrically along the circumference of the housing and directly and closely packed next to one another in a brush-type manner, respectively.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for the sealing-off of two spaces acted upon by media of different pressures, such as fluid and/or gases, particularly for turbo-machinery, comprising:

sealing ring means arranged in a cylindrical housing device and with respect to an adjacent housing section to form a secondary seal between said spaces and being disposed with respect to an adjacent rotor section to form a radial sealing gap means as a primary seal between said spaces, wherein the sealing ring means are connected at one ends of and centered around said rotor section by bending-rod-type spring element means concentrically spaced about the machine axis which are fixedly anchored at their other ends on one side of the cylindrical housing device and are arranged essentially in parallel to the machine axis, and wherein the radial sealing gap means between the sealing ring means and adjacent rotor section are dimensioned such that they form an air-bearing type bearing gap with respect to a given pressure difference (P1>P2) between the two machine spaces.

2. An arrangement according to claim 1, wherein a secondary leakage flow passage is formed between one front wall of the housing device and the sealing ring means and communicates with one of the machine spaces.

3. An arrangement according to claim 1, wherein the housing device, with first and second wall sections bordering on the sealing ring means, forms a chamber which communicates with both machine space, and wherein a secondary leakage flow passage, which communicates with the space having the lower pressure, is formed between the first wall section of the housing device and the sealing ring.

4. An arrangement according to claim 2, wherein the housing device, with first and second wall sections bordering on the sealing ring means, forms a chamber which communicates with both machine space, and wherein a secondary leakage flow passage, which communicates with the space having the lower pressure, is formed between the first wall section of the housing device and the sealing ring.

5. An arrangement according to claim 4, wherein the secondary leakage flow passage is constructed as an axial gap between an outer front end of the first wall section extending essentially in parallel radially outwardly of the spring element means and an outer front face of the sealing ring means.

6. An arrangement according to claim 2, wherein the secondary leakage flow passage is constructed as an axial gap between the outer front end of a housing wall section extending essentially in parallel radially inwardly of the spring element means and an outer circumferential surface of the sealing ring means.

7. An arrangement according to claim 3, wherein the housing device is composed of a ring-shaped hood body containing the first wall section and of a stator component of the sealing device which is firmly connected with the hood body and contains the second wall section.

8. An arrangement according to claim 5, wherein the housing device is composed of a ring-shaped hood body containing the first wall section and of a stator component of the sealing device which is firmly connected with the hood body and contains the second wall section.

9. An arrangement according to claim 5, wherein the secondary leakage flow passage is constructed as an axial gap between the outer front end of a housing wall section extending essentially in parallel radially inwardly of the spring element means and an outer circumferential surface of the sealing ring means.

10. An arrangement according to claim 5, wherein another secondary leakage flow passage is formed as an axial gap between the outer front end of a third wall section of the sealing ring extending essentially in parallel radially inwardly of the spring elements and an adjacent circumferential surface of the stator component of the sealing device.

11. An arrangement according to claim 10, wherein the second and the third wall section enclose an annular chamber which, by way of the one and the additional secondary flow passage, makes available the secondary leakage flow of the respective pressure medium from the machine space with the higher pressure (P1) to the machine space with the lower pressure (P2).

12. An arrangement according to claim 11, wherein the third wall section of the sealing ring, with respect to a shaft section of the rotor, forms two air-bearing-type bearing gaps which are separated from one another by a ring gap, a sealing fluid supply, on the interior side of the shaft, being provided from the ring gap into the bearing gaps as well as into the annular chamber formed between the second and the third wall section the sealing fluid flowing out of this annular chamber, by way of the one secondary leakage flow point, into the one machine space and, by way of the other secondary leakage flow point, flowing into the other machine space.

13. An arrangement according to claim 1, wherein a shaft section ring-shaped hood body is formed by a correspondingly recessed shaft section of the rotor shaft, wherein the sealing ring means includes a shaft section sealing ring centered in the shaft section ring shaped hood body by means of the bending rod-type spring element means such that the shaft section sealing ring forms a radial sealing gap with respect to a counter surface of the rotor shaft disposed radially inwardly of the shaft section sealing means.

14. An arrangement according to claim 7, wherein additional axial ring gaps between the ring-shaped hood body and the sealing ring are provided as secondary leakage flow passages and throttling points.

15. An arrangement according to claim 14, wherein the sealing ring is arranged between rotors or shafts of a turbomachine which are disposed coaxially against one another, particularly of a gas turbo engine.

16. An arrangement according to claim 1, wherein the sealing ring means includes a plurality of sealing rings disposed at different locations in a turbo machine for sealing respective different sets of pressure spaces with respect to one another.

17. An arrangement for the sealing-off of two spaces acted upon by media of different pressures, such as fluid and/or gases, particularly for turbo-machinery, comprising:
sealing ring means arranged in a cylindrical housing device and with respect to an adjacent housing section to form a secondary seal between said spaces and being disposed with respect to an adjacent rotor section to form a radial sealing gap means as a primary seal between said spaces,
wherein the sealing ring means are connected at one ends of and centered around said rotor section by a brush-type-packed spring element means located against one another in a springing and damping combination and concentrically spaced about the machine axis essentially parallel to the machine axis, the other ends being fixedly anchored on one side of the cylindrical housing device,
and wherein the radial sealing gap means between the sealing ring means and adjacent rotor section are dimensioned such that they form an air-bearing type bearing gap with respect to a given pressure difference (P1>P2) between the two machine spaces.

18. An arrangement according to claim 17, wherein a secondary leakage flow passage is formed between one front wall of the housing device and the sealing ring means and communicates with one of the machine spaces.

19. An arrangement according to claim 17, wherein the housing device, with first and second wall sections, bordering on the sealing ring means, forms a chamber which communicates with both machine spaces, and
wherein a secondary leakage flow passage, which communicates with the space having the lower pressure, is formed between the first wall section of the housing device and the sealing ring.

20. An arrangement according to claim 18, wherein the housing device, with first and second wall sections, bordering on the sealing ring means, forms a chamber which communicates with both machine spaces, and
wherein a secondary leakage flow passage, which communicates with the space having the lower pressure, is formed between the first wall section of the housing device and the sealing ring.

21. An arrangement according to claim 20, wherein the secondary leakage flow passage is constructed as an axial gap between an outer front end of the first wall section extending essentially in parallel radially outwardly of the spring element means and an outer front face of the sealing ring means.

22. An arrangement according to claim 18, wherein the secondary leakage flow passage is constructed as an axial gap between the outer front end of a housing wall section extending essentially in parallel radially inwardly of the spring element means and an outer circumferential surface of the sealing ring means.

23. An arrangement according to claim 19, wherein the housing device is composed of a ring-shaped hood body containing the first wall section and of a stator component of the sealing device which is firmly connected with the hood body and contains the second wall section.

24. An arrangement according to claim 21, wherein the housing device is composed of a ring-shaped hood body containing the first wall section and of a stator component of the sealing device which is firmly connected with the hood body and contains the second wall section.

25. An arrangement according to claim 21, wherein the secondary leakage flow passage is constructed as an axial gap between the outer front end of a housing wall section extending essentially is parallel radially inwardly of the spring element means and an outer circumferential surface of the sealing ring means.

26. An arrangement according to claim 21, wherein another secondary leakage flow passage is formed as an axial gap between the outer front end of a third wall section of the sealing ring extending essentially in parallel radially inwardly of the spring elements and an adjacent circumferential surface of the stator component of the sealing device.

27. An arrangement according to claim 26, wherein the second and the third wall section enclose an annular chamber which, by way of the one of the additional secondary flow passage, makes available the secondary leakage flow of the respective pressure medium from the machine space with the higher pressure (P1) to the machine space with the lower pressure (P2).

28. An arrangement according to claim 26, wherein the third wall section of the sealing ring, with respect to a shaft section of the rotor, forms two air-bearing-type bearing gaps which are separated from one another by a ring gap, a sealing fluid supply, on the interior side of the shaft, being provided from the ring gap into the bearing gaps as well as into the annular chamber formed between the second and the third wall section the sealing fluid flowing out of this annular chamber, by way of the one secondary leakage flow point, into the one machine space and, by way of the other secondary leakage flow point, flowing into the other machine space.

29. An arrangement according to claim 17, wherein a shaft section ring-shaped hood body is formed by a correspondingly recessed shaft section of the rotor shaft, wherein the sealing ring means includes a shaft section sealing ring centered in the shaft section ring shaped hood body by means of the bending rod-type spring element means such that the shaft section sealing ring forms a radial sealing gap with respect to a counter surface of the rotor shaft disposed radially inwardly of the shaft section sealing means.

30. An arrangement according to claim 23, wherein additional axial ring gaps between the ring-shaped hood body and the sealing ring are provided as secondary leakage flow passages and throttling points.

31. An arrangement according to claim 30, wherein the sealing ring is arranged between rotors or shafts of a turbomachine which are disposed coaxially against one another, particularly of a gas turbo engine.

32. An arrangement according to claim 17, wherein the sealing ring means includes a plurality of sealing rings disposed at different locations in a turbo machine for sealing respective different sets of pressure spaces with respect to one another.

33. An arrangement for the sealing-off of two spaces acted upon by media of a different pressure, for turbo machines, in which a sealing ring is arranged in a cylindrical housing while forming a radial sealing gap as a primary seal, and having a secondary leakage flow passage between a wall section of the housing and the sealing ring which communicates with the space having the lower pressure, the sealing ring being centered by means of spaced spring elements which are anchored at the housing on one side and are arranged essentially in parallel with respect to the machine axis.

* * * * *